TELEVISION MULTIPLE CHANNEL RECORDER

Filed Jan. 28, 1958 5 Sheets-Sheet 1

INVENTORS
NORMAN ALPERT
LEONARD E. SHERBIN
BY
Kenyon & Kenyon
ATTORNEYS

TELEVISION MULTIPLE CHANNEL RECORDER

Filed Jan. 28, 1958

5 Sheets-Sheet 2

INVENTORS
NORMAN ALPERT
LEONARD E. SHERBIN
BY
Kenyon & Kenyon
ATTORNEYS

INVENTORS
NORMAN ALPERT
LEONARD E. SHERBIN
BY
Kenyon & Kenyon
ATTORNEYS

TELEVISION MULTIPLE CHANNEL RECORDER

Filed Jan. 28, 1958

INVENTORS
NORMAN ALPERT
LEONARD E. SHERBIN
BY
Kenyon & Kenyon
ATTORNEYS

TELEVISION MULTIPLE CHANNEL RECORDER

INVENTORS
NORMAN ALPERT
LEONARD E. SHERBIN
BY
Kenyon & Kenyon
ATTORNEYS

United States Patent Office 2,965,433

Patented Dec. 20, 1960

2,965,433

TELEVISION MULTIPLE CHANNEL RECORDER

Norman Alpert, Scarsdale, and Leonard E. Sherbin, New Hyde Park, N.Y., assignors to Bulova Research and Development Laboratories, Inc., Long Island, N.Y., a corporation of New York Filed Jan. 28, 1958, Ser. No. 711,606

14 Claims. (Cl. 346—37)

This invention relates generally to apparatus for recording the viewing habits of television users and more particularly to improved devices operative in conjunction with television receivers for automatically recording data useful in preparing audience surveys.

There are available today many audience response measuring devices and systems designed to provide a means to sample the television viewing audience's habits. Such systems often make use of collaborators who permit a recording device to be placed in their home which records viewing time and the channel or channels watched. For the most part such devices and systems record the data on film, tape or other media in the form of a code which must be translated into useful data. In general these systems have proven unsatisfactory due to the complexity of the coding and the delay which results from the translation procedure. Another drawback incident to existing devices is that they are relatively difficult to install and either require elaborate mechanical linkages to the tuning dial of a television receiver or involve electrical coupling means which must physically be connected to components in the receiver.

In view of the foregoing, it is the principal object of this invention to provide a television multiple channel recording device which will record a complete set of facts, in easily usable form which requires neither coding nor trained personnel to interpret the data recorded.

More specifically, it is an object of the invention to provide a recording device which may be readily coupled to a television receiver without the need for elaborate mechanical or electrical coupling expedients.

Another object is to provide a novel scanning means for determining the channel setting of a television receiver and which causes a tuner to home to the lowest frequency receivable by the tuner, thereby to eliminate problems of false triggering due to harmonics of the lowest frequency.

A further object is to provide novel signal pick-up means for coupling the scannnig tuner to the local oscillator stage of the television receiver.

In keeping with the above objects this invention provides a novel scanning system which samples the operating frequencies of the local oscillator stage in a television receiver to produce a signal dependent on the channel to which the particular set is tuned, the signal acting to arrest the scanning system at a channel position corresponding to the channel setting of the receiver. The arrangement is such that if the receiver remains tuned to any channel for a predetermined period of time, it causes a clock-printing device to print the time a particular channel is tuned in and the total dwell time the receiver is tuned thereto. Further means are provided for recording the day, month, and year; the channel number, the time the television set is turned on; and the time it is turned off. All of this information is recorded on easily changeable paper tape in numerals and letters that may be read by untrained personnel.

Other objects and features may be inferred from the description below and drawings in which:

Fig. 1 is a block diagram illustrating the main components of a device in accordance with the invention and their cooperative relation;

Figs. 2 and 3 together illustrate the schematic circuit diagram of the control mechanism, time-printing means, and channel symbol printer of a preferred embodiment of this invention, the circuit being divided between the two figures;

Figures 1, 2:
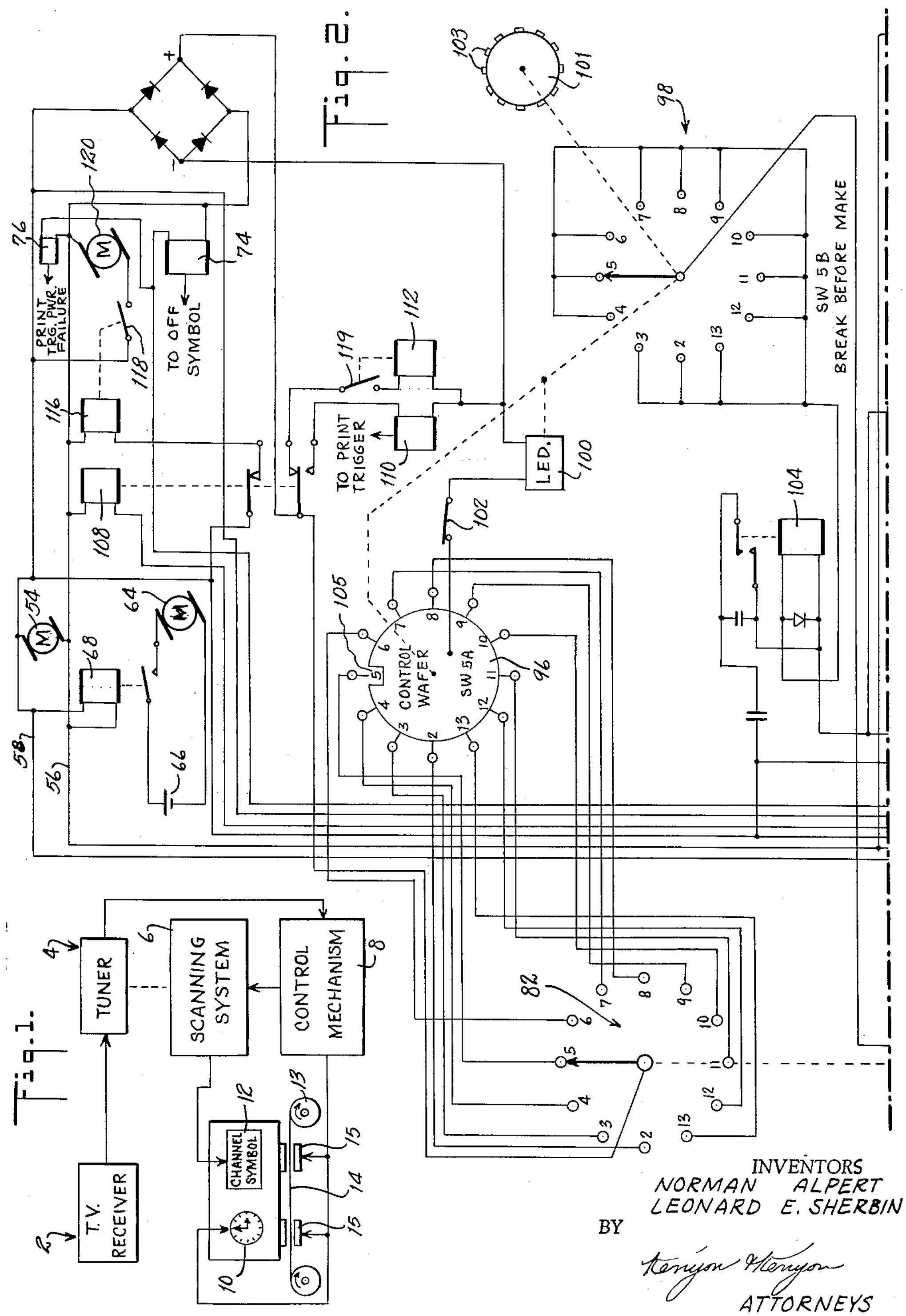

Referring now to Figs. 1–4, the recorder of this invention comprises the following major components:

(*a*) A television receiver 2 having a local oscillator stage whose frequency varies throughout a given range as the receiver is tuned to the several program channels thereof.

(*b*) A channel symbol printer 12.

(*c*) A time-printing means 16.

(*d*) A tuner 4.

(*e*) A scanning system 6.

(*f*) A control mechanism 8.

In general terms the operation of this device is as follows:

A conventional television receiver 2 of the super heterodyne type having a local oscillator stage whose frequency varies as the receiver is selectively tuned is provided with a pick-up means (described below) which samples the frequency of the signal generated by the local oscillator tube. The signal yielded by the pick-up means is fed to a tuner 4 which preferably is of the turret type having its inductances modified so as to resonate to the frequencies of the local oscillator tube. The tuner 4 is mechanically connected to a scanning system 6 which serves to tune the tuner 4 in a stepwise manner.

When the tuner is in the key position correspondent to the frequency of the local oscillator tube, the resultant output signal actuates the control mechanism 8. The control mechanism 8 serves to arrest the scanning of the tuner at the key position and also functions to actuate the time printing means 10 and the channel symbol printer 12 in order to record data on a paper tape illustrated in Fig. 1 at 14. The channel symbol printer 12 is under the control of the scanning system 6 so that as the tuner 4 is tuned throughout its range appropriate channel symbols are placed in a printing position. Thus when the scanning system is arrested a symbol indicative of the receiver channel setting occupies the printing position relative to the recording tape.

In addition to the channel symbol information obtainable there is also provided, by means of the time-printer 10, information relative to the elapsed or dwell time of the television receiver 2 at a particular channel setting, the data and the time the television receiver 2 is turned on and the time the television receiver is turned off.

Figure 3:
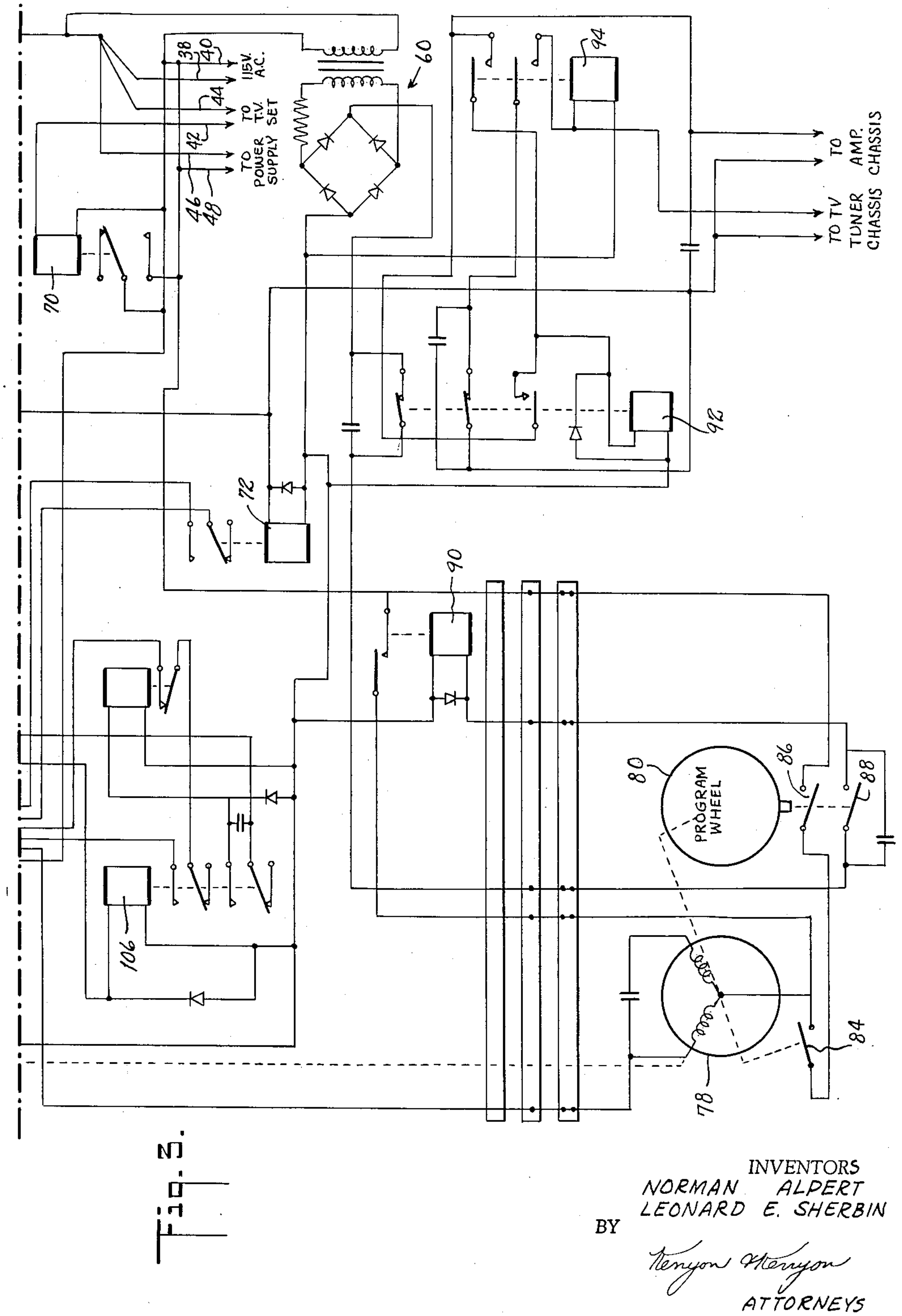
Figures 7, 8:
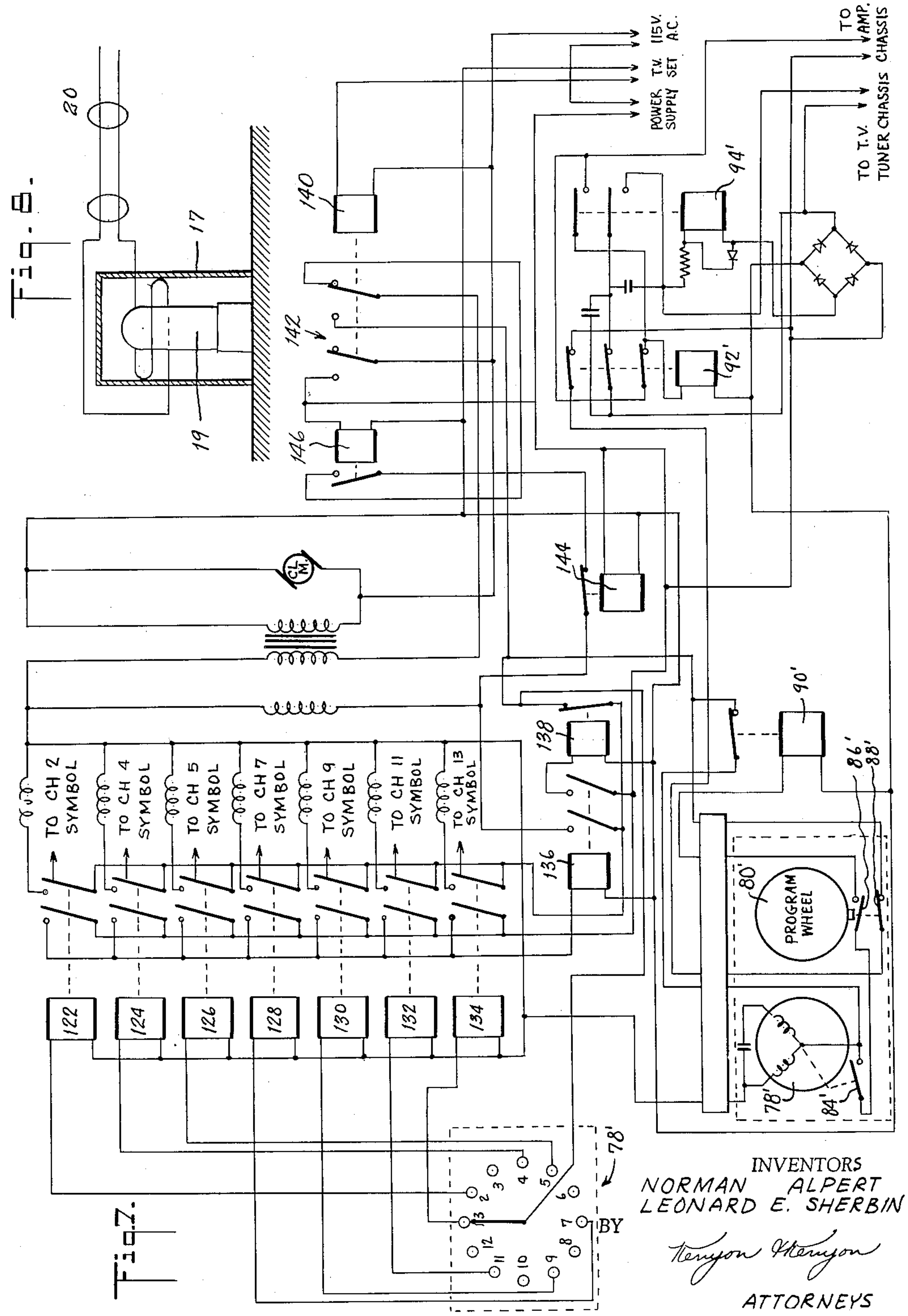
Fig. 7 is a circuit diagram of an alternate construction of the time printing means and channel symbol printer of this invention.
Fig. 8 is a schematic view of a preferred pick-up means.

The time-printing means 10 may be of the standard type, such as the Productograph type of device manufactured by the Simplex Company. Standard components used in the recorder of this invention have been modified substantially to adapt them for the particular use made of them in this invention. In Figs. 2, 3, and 7 these modifications have been indicated by the variations in the circuitry illustrated there. The necessary adaptations are a part of this invention and are required for the recorder of this invention to operate properly.

Figures 5, 6:
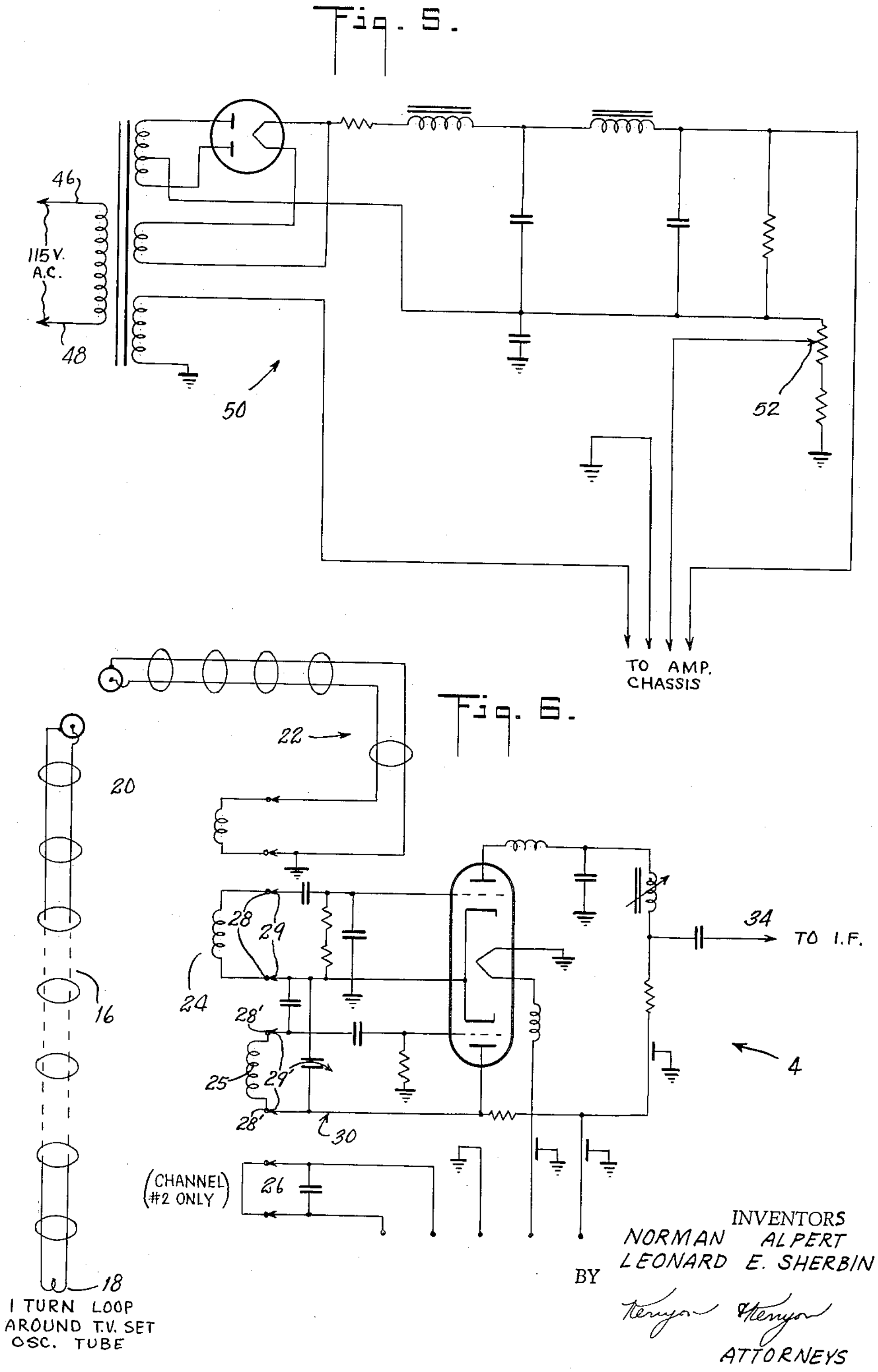
Fig. 5 is a circuit diagram of the power supply employed in the recorder of this invention.
Fig. 6 is a circuit diagram of the tuner of this invention.

Referring now to Fig. 6. The local oscillator frequency of the television receiver 2 is sampled by a pick-up means 16 which has a single loop 18 placed around the local television oscillator tube within the usual tube shield. The coupling is loose and has no effect on the operation of the television receiver. The tube shield is left in place so as to maintain a satisfactory radiation level and prevent extraneous signals from being picked up. There is no need to modify the local television set or to, solder the connection. It is sufficient if the connecting means 20 (illustrated as a coaxial cable) is attached to the loop 18 in the manner well known in the art.

In place of the single loop 18 placed around the oscillator tube within the usual tube shield it may be desirable as shown in Fig. 8 to provide for a special tube shield 17 for the oscillator tube 19 which has the single loop 18*a* formed as an integral portion of the interior walls thereof. In this instance connections would be provided exterior to the walls of the tube shield 17 for attaching the connecting means 20.

Reverting to Fig. 6, the signal induced in the pick-up means 16 is introduced to the tuner 4 directly into the input stage by means of a coupling cable 22 or any other convenient means which may be connected to the line 20.

Figure 4:
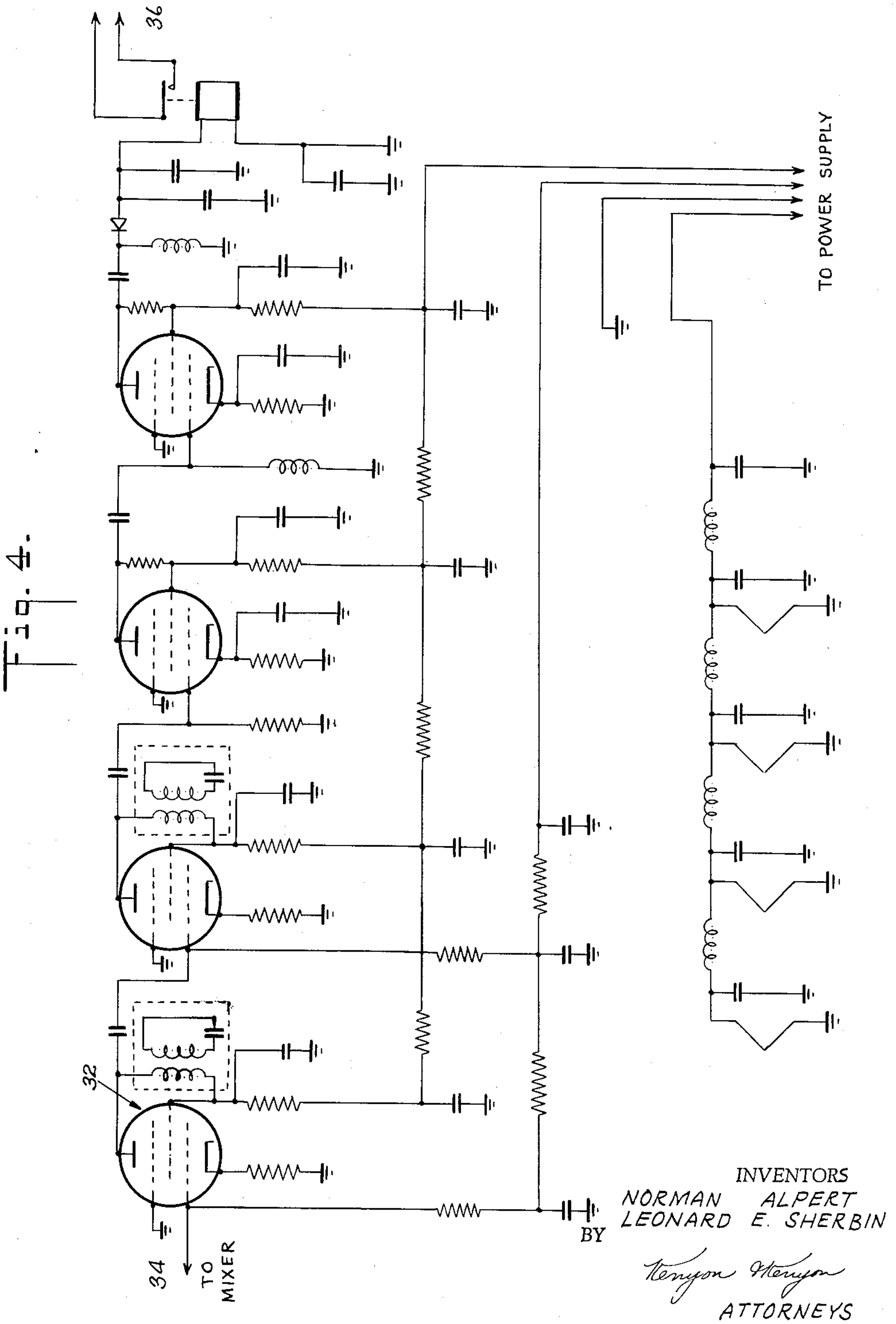
Fig. 4 is a circuit diagram of the modified itnermediate frequency amplifier employed in the recorder of this invention.

The tuner 4 is a television turret type tuner in which the inductances are modified to resonate to the oscillator frequencies of the local television receiver 2. In Fig. 6 only one induction coil 24 is shown of the plurality that would normally be available to such a turret type tuner. In addition to the input inductance coils 24 there is provided a set of shorted contacts 26 at the position of tuner 4 which corresponds to the channel 2 position. The purpose of the shorted contacts 26 will be fully explained below. In the manner customary, a tuner shaft (not shown) is used to position the inductance coils 24, 25 with their contacts 28 and 28′ at the input contacts 29 and 29′ to the tuner 4. The tuner shaft (not shown) is driven by the scanning system 6 described below. The local oscillator section 30 of the tuner 4 produces a signal which, when mixed with the induced signal of the oscillator tube of the local television receiver 2, produces an intermediate frequency output signal when the inductance coil 24 corresponding to the frequency of the local oscillator tube is in the proper position. The output signal is fed, by means of a connection 34, to the intermediate frequency amplifier 32 as shown in Fig. 4. The signal is suitably amplified and is used to actuate a relay 36 coupled to the final output stage of the intermediate frequency amplifier 32.

Referring now to Figs. 2 and 3. Power is supplied to all circuits including the local television receiver 2 by means of leads 38, 40 which are connected to the local source of power, in this instance the normal 115 volt A.C. found in most homes. Leads 42, 44 are provided for supplying power to the local television receiver 2 and leads 46, 48 supply power to power supply 50 illustrated in Fig. 5. The power supply 50 is of standard design and supplies power to the tuner 4 and the intermediate frequency amplifier 32. A variable resistor 52 controls the gain in the intermediate frequency amplifier by controlling bias on the first two stages. This provides for an adjustment for variations found between different television receivers.

Power is supplied to the clock motor 54 of the time-printing means at all times by means of leads 56, 58 which are connected to the power source. Thus the clock portion of the time-printing means 10 is powered at all times. In case of a power failure in the local supply a standby motor 64 is provided which is automatically connected to a source of potential 66 by means of relay 68 which is normally held open by the power supplied through leads 56 and 58. Therefore the clock portion of the time printing means 10 will continue to keep proper time in the event of a power failure in the house supply.

When the local television receiver 2 is turned on a relay 70 is actuated which supplies power to the recorder circuitry in general. The actuation of relay 70 supplies direct current power for the operation of the remainder of the circuit via the transformer-rectifier bridge network 60. The actuation of relay 70 also closes the contacts of relay 72. This serves to position the off symbol solenoid 74 and the power failure solenoid 76 by cocking plungers (not shown) to which are attached the off and power failure symbols. As long as the television receiver remains on the off symbol will remain in the cocked position. In the event of the receiver 2 being turned off or a power failure, the off symbol solenoid 74 will be released and the off symbol will print by means of a printing trigger connected to relay 76.

The hunting or programming of the tuner 4 is controlled by the scanning system 6 illustrated in Figs. 2 and 3. A motor 78 is provided with a shaft (not shown) mechanically ganged to a program wheel 80 and a stepping switch 82. The motor 78 is controlled by the operation of switches 84, 86 and 88, relays 90, 92, 94 and 36. When the power is turned on the motor 78 is at rest. Switches 84 and 86 are open and switch 88 is closed; the contacts of relay 90 are initially open and switch 84 is held open by means (not shown) positioned on the motor shaft. As soon as power is applied to the motor 78 the armature centers between the face and switch 84 closes. Switch 86 is held open by one of the channel cams (not shown) on the shaft of the program wheel 80, while switch 88 is held closed.

When the local television set is turned on power is supplied to this circuitry as described above and the motor remains stationary until the contacts of relay 90 close. Relay 90 is a time delay relay. On the closing of the contacts of relay 90, switches 84, 86 are bypassed. As the shaft of the motor 78 rotates, switch 84 is closed and the channel cam, mentioned above, moves permitting switch 86 to close and switch 88 to open. The opening of switch 88 releases the contacts of relay 90 and the motor circuit is completed through switches 84 and 86.

The program wheel 80, the motor 78, the shaft of the tuner 4 and stepping switch 82 are all mechanically ganged together through gear reduction mechanism not shown, but illustrated by means of the dotted lines connecting the shafts of all except the tuner 4 and illustrated schematically in Figs. 2 and 3. Thus the operation of motor 78 acts to move all of these elements simultaneously. When the connecting shaft (described above) is moved to the next tuner position switches 84 and 86 are open and switch 88 is closed by a channel cam. This cycle repeats as long as the unit is hunting which will be until the hunting operation described below has been completed and an output signal is received by the control mechanism 8 (described below) which stops or interrupts the operation of the scanning system 6.

When the induction coil 24 of tuner 4 is positioned in such a manner that it will accept the signal produced by the pickup means 16 an output signal from tuner 4 will be produced. As described above relay 36 will then be actuated. The actuation of relay 36 serves to stop the hunting and maintain the tuner in that position until the television receiver 2 is tuned to another station. The channel cams on the program wheel 80 are adjusted so that the hunting or scanning can be controlled to include only the channels which are receivable in the geographic location where the particular television receiver to be surveyed is located.

Relays 92, 94 and 36 are used to stop the hunting of the tuner 4 when the turret reaches its proper position and are also used to prevent the operation of the printing mechanisms on higher harmonics of lower frequency channels. The contacts of relay 36 will remain open until the tuner 4 reaches proper position at which time they will close as disclosed above. The shorted contacts 26 are connected in the channel 2 position of the turret closing the circuit to relay 94. Only after relay 94 has been actuated can relay 92 be actuated. When the turret reaches the proper channel relay 92 is actuated by means of its connections to relay 94 and self latches while relay 92 releases. Release of relay 92 assures that when the tuning combination of the television receiver 2 is changed the tuner 4 has to home to the channel 2 position before relay 92 may be actuated. In this way relay 92 cannot be actuated by any harmonics having a lower frequency since the tuner 4 starts to hunt from the lowest frequency channel (in this case channel 2) and will stop at the first fundamental frequency thereafter. When the tuned combination of the television receiver is changed and the tuner 4 rotates through the higher frequency channels relay 94 releases and the closing of relay 36 is in effect.

Relay 94 is a slow release relay so that relay 92 has time to fully close and latch before relay 94 opens. This prevents oscillations between the relays 92, 94 and assures reliable operation.

When relay 92 is actuated it breaks the circuit to relay 90 and thereby stops the rotation of the motor 78 and hence stops the hunting of the tuner 4 at the proper channel position. It also opens the circuit to relay 94 as previously discussed. When the television receiver 2 is turned to another channel relay 92 is open, the tuner 4 rotates to the channel 2 position where relay 94 is closed, latches up and the sequence repeats, as discussed above.

A channel symbol printing means 12 is provided which is controlled by the scanning of the tuner 4 by means of the stepping switch 82 connected to a control wafer 96. As the motor 78 rotates the position of the movable contact of switch 82 varies. This will in turn supply power to a means for rotating stepping switch 98 mechanically ganged to the control wafer 96. The means for rotating stepping switch 98 and hence control wafer 96, is a rotating solenoid 100 having ratchet and pawl mechanism (not shown) such as the Ledex made by the G. H. Leland company. The rotating solenoid 100 is placed in the circuit in series of stepping switch 82 and control wafer 96. Consequently if control wafer 96 and stepping switch 82 are not in exact correspondence the solenoid 100 has power applied to it which will cause it to advance the stepping switch 98 until all three are in exact correspondence. An interrupter switch 102 is operated by the ratchet and pawl mechanism so as to cause the rotating solenoid 100 to operate in a stepwise fashion. Mechanically ganged to the shaft connecting switch 98 and control wafer 96 is a channel symbol wheel 101 which has a number of channel symbols 103 positioned around its periphery. Thus as the tuner 4 is stepped by the scanning system 6 the channel symbol wheel 101 will be positioned so that the proper channel symbol 103 is in a position to print. When stepping switches 82, 98 are in exact correspondence the notch 105 provided in control wafer 96 opens the circuit to the rotating solenoid 100, thereby stopping its stepwise movement.

Relay 104 is controlled by the movement of stepping switch 98. The relay 104 is a slow pull in fast drop out relay. The time delay given by the relay 104 is greater than the time delay provided by relay 90. Hence the delay in time is greater than the scanning time of the tuner 4 and the drop out time is faster than the dwell time. Consequently relay 104 is not actuated until the hunting has ceased for a required time interval. When the hunting has ceased (as described above) and relay 104 is actuated it supplies current to a ten second time delay relay 106. The closing of relay 106 actuates the print relay 108.

The sole function of relay 104 is to prevent the interruption of the stepping impulses from the switch 98 by relay 106. If the tuning combination of the television receiver is changed before the ten second time delay there will be no printing since the circuit to the print relay 108 will not be closed.

The effect of applying power to the print relay 108 is to apply power to the printing trigger solenoid 110 causing the printing hammers 15 to be actuated. Relay 112 serves to remove power from the printing relay 108 which causes the release of the printing reset relay 108 and releases the printing relay 112 which in turn opens the hammer shaft switch 119. Thus if the tuned combination of the television receiver 2 remains the same for the period of time introduced by the time delays, the data provided by the printing mechanisms will be recorded on tape 14.

A further effect of the removal of the power to the printing relay 108 is to operate the elapsed time mechanism of the time printing means 10. The elapsed time means is of the standard type well known in the art. The elapsed time means permits an indication of the dwell time on a particular channel setting of the local television receiver 2. When the printing mechanism is actuated initially by the turning on of the set the elapsed time means is actuated and begins to time. When the tuning combination of the local receiver is changed and a further printing is made the reset solenoid 116 is actuated closing micro switch 118 and actuating reset motor 120 which serves to reset the elapsed timer to a zero setting.

When the television receiver 2 is turned off relay 70 opens, removing power from the circuitry and as a consequence causes relay 72 to open. This releases the printing trigger 76 and actuates printing relay 108 to cause a final printing of the elapsed viewing time and the channel to which the television receiver was tuned at that particular time. The next time the television receiver 2 is turned on the off symbol solenoid 74 and its printing trigger solenoid 76 are recocked and are in position to print again as described above. The precise design of the time printing mechanism other than the circuitry which is explained above is entirely conventional. It is necessary to provide for means to print the following information in this portion of the recorder of this invention.

(*a*) Month
(*b*) Date
(*c*) Time to nearest minute
(*d*) A.M. or P.M.
(*e*) Elapsed time during which each channel is tuned
(*f*) Channel Number
(*g*) Time when set is turned off (no channel number is printed to indicate that TV set was turned off in the alternate embodiment shown in Fig. 7 and discussed below.)

The information is printed on a paper tape 14 similar to that which is currently used in the Productograph type of Simplex Clock. The paper may be collected at any convenient time by tearing and removing the desired portion from the take-up roll 13.

Fig. 7 shows an alternate embodiment of this invention. In the embodiment shown in Figure 7 the principal difference from the previously discussed embodiment lies in the provision for separate channel symbol relays 122, 124, 126, 128, 130, 132 and 134, or one channel symbol relay for each channel which may be received by television receiver located in an area where seven channels are available. Each of the relays 122, 124, 126, 128, 130, 132 and 134 has a separate channel symbol, a printing mechanism associated with it and is used to provide a printing circuit for each particular channel.

The operation of this unit is similar to the embodiment described above except as indicated below. Each of the relays 122, 124, 126, 128, 130, 132 and 134 is a ten second time delay relay. As before the ten second time delay is used to prevent recording of data on the paper tape 14 with the viewer is tuning between channels and deciding which channel he wishes to watch. This time delay can be varied if desired. When the contacts of the relays 122, 124, 126, 128, 130, 132 and 134 close the circuit to the channel symbol printing mechanism is closed, the interval timer is closed and the proper symbols are positioned for printing. The other contact closes the circuit to a one second time delay relay 136. One of the set of contacts of the relay 136 closes the circuit to the printing relay (not shown) and actuates the printing hammer (not shown). The other contact closes the circuit to relay 138 which has a time delay of one second. The actuation of relay 138 serves to open the circuit to the channel symbol printing mechanisms and the printing relays thus releasing them. The channel relays 122, 124, 126, 128, 130, 132 and 134 are actuated as long as switch 78' remains in one position. This permits the channel number and printing hammer to return to its normal position and removes the voltage from the corresponding solenoid. No other printing of information can occur until the channel is changed by the viewer or the television set is turned off.

When the channel is changed on the television set the voltage is removed from the channel relay 122, 124, 126, 128, 130, 132, and 134 and this in turn removes the voltage from relay 138 and when the contacts of relay 138 close the unit is ready to print. The time delays provided by relays 136, 138 are necessary in order to prevent false printing due to premature actuation of the print relay.

When the television set is turned on as before the current to relay 140, which corresponds to relay 70 in the previous embodiment, opens the contacts 142. This supplies power to the relays of this embodiment which correspond to the relays discussed in the previous embodiment which govern the hunting or programming of the tuner 4. Like relays are given like numbers in this embodiment and the hunting and arresting of the tuner 4 is as discussed above. When the television set is turned off in this embodiment the current to relay 140 is broken and it returns to its original position.

The contacts of relay 144 are normally closed. When the television set was turned on these contacts opened. Relay 144 is a thermal time delay relay and it will taken approximately two seconds for these contacts to close after the television set is turned off. In addition a time delay relay 146 is provided. The closing of the contacts of relay 144 actuates the printing relay to print the time when the television receiver is turned off. The opening of relay 146 operates to remove the voltage from the printing relay and permits the printing hammer to return to its original position. The voltage to this circuit is applied only when relay 140 is in its off position. Thus when the television set is turned off the elapsed time means and the printing hammer circuits are actuated to record the elapsed viewing time and the time the television set was turned off on the tape.

In this manner the embodiment shown in Figure 7 may be used to print the same information that can be recorded by means of the embodiment illustrated in Figures 2 and 3.

We claim:

1. Apparatus for recording the listening habits of a user of a multi-channel television receiver having a local oscillator whose frequency varies in a step-wise manner as the receiver is selectively tuned, said apparatus comprising a printing device to record the channel setting of said receiver and the dwell time thereat; said device including a time-printing means, a channel symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of said local oscillator; scanning means automatically causing said tuner to scan throughout its channel range and means responsive to said output signal to arrest said scanning means at the tuner channel corresponding to the selected local oscillator frequency; and an actuating means coordinating said printing device with said scanning system and including means operatively intercoupling said tuner and said channel-symbol printer whereby as said tuner is scanned said channel symbol is caused to assume a printing position in accordance with the channel setting of the receiver, and means responsive to said output signal to activate said channel-symbol printer and said time printing means simultaneously to print said indicia of time and channel setting.

2. Apparatus for recording the listening habits of a user of multi-channel television receiver having a local oscillator whose frequency varies step-wise as the receiver is selectively tuned, said apparatus comprising a printing device to record the channel setting of said receiver and the dwell time thereat; said device including a time-printing means, a channel symbol printer, and a control mechanism to activate said time-printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; means for causing said scanning means to scan past the lowest frequency receivable by said tuner before said arresting means is operative; and an actuating means coordinating said printing device with said scanning system and including means operatively intercoupling said tuner and said channel-symbol printer whereby as said tuner is scanned said channel-symbol is caused to assume a printing position in accordance with the channel setting of the receiver, and means responsive to said output signal to activate said channel-symbol printer and said time printing means simultaneously to print said indicia of time and channel setting.

3. Apparatus for recording the listening habits of a user of multi-channel television receiver having a local oscillator whose frequency varies step-wise as the receiver is selectively tuned, said apparatus comprising a printing device to record the channel setting of said receiver and the dwell time thereat; said device including a time printing means, a channel symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; an actuating means coordinating said printing device with said scanning system and including means operatively intercoupling said tuner and said channel symbol printer whereby as said tuner is scanned said channel-symbol is caused to assume a printing position in accordance with the channel setting of the receiver, and means responsive to said output signal to activate said channel symbol printer and said time printing means simultaneously to print said indicia of time and channel setting and including time delay means for preventing the activation of said time printing means and said channel symbol printer for a predetermined period of time after said tuner's scanning has been arrested.

4. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner turnable step-wise to the respective frequencies of said local oscillator to produce an output channel tuner tunable step-wise to the respective frequency of the local oscillator; scanning means automatically causing said tuner to scan throughout its channel range and means responsive to said output signal to arrest said scanning means at the tuner channel corresponding to the selected local oscillator frequency; an actuating means coordinating said printing device with said scanning system including means operatively intercoupling said tuner and said channel-symbol printer whereby as said tuner is scanned said channel-symbol is caused to assume a printing position in accordance with the channel setting of the receiver; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for preventing the activation of said time printing means and said channel-symbol printer for a predetermined period of time after said tuner's scanning has been arrested.

5. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency, and actuating means coordinating said printing device with said scanning system; a channel-symbol wheel having a plurality of channel-symbols on the periphery thereof; means for operatively intercoupling said tuner and said channel-symbol wheel whereby as said tuner is scanned said channel-symbol wheel is caused to assume a printing position in accordance with the channel setting of the receiver, and means responsive to said output signal to activate said channel-symbol printer and said time printing means simultaneously to print said indicia of time and channel setting and including time delay means for preventing the activation of said time printing means and said channel-symbol printer for a predetermined period of time after said tuner's scanning has been arrested.

6. Apparatus for recording the listening habits of a user of a multi-channel television receiver having a local oscillator including a shielded oscillator tube whose frequency varies step-wise as the receiver is selectively tuned, said apparatus comprising a printing device to record the channel setting of said receiver and the dwell time thereat; said device including a time printing means, a channel-symbol printer, and a control mechanism to activate said time pirnting means and said symbol printer to provide channel setting and time indicia on a recording medium; a scanning system coupled to the local oscillator of said receiver including a multi-channel tuner tunable step-wise to the respective frequencies of said local oscillator to produce an output signal only when the tuner is tuned to the selected frequency of the local oscillator and coupling means comprising a single loop of induction wire positioned around said oscillator tube of said local oscillator within the tube shield thereof for introducing the frequency of the local oscillator to said tuner; an actuating means coordinating said printing device with said scanning system including means operatively intercoupling said tuner and said channel symbol printer whereby as said tuner is scanned said channel-symbol is caused to assume a printing position in accordance with the channel setting of the receiver; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for prevening the activation of said time printing means and said channel-symbol printer for a predetermined period of time after said tuner's scanning has been arrested.

7. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; means for causing said scanning means to scan past the lowest frequency receivable by said tuner before said arresting means is operative; and actuating means coordinating said printing device with said scanning system; a channel-symbol wheel having a plurality of channel-symbols on the periphery thereof; means for operatively intercoupling said tuner and said channel-symbol wheel whereby as said tuner is scanned said channel-symbol wheel is caused to assume a printing position in accordance with the channel setting of the receiver, and means responsive to said output signal to activate said channel-symbol printer and said time printing means simultaneously to print said indicia of time and channel setting and including time delay means for preventing the activation of said time printing means and said channel-symbol printer for a predetermined period of time after said tuner's scanning has been arrested.

8. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel, setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency means for causing said scanning means to scan past the lowest frequency receivable by said tuner befor said arresting means is operative; and actuating means coordinating said printing device with said scanning system; a channel-symbol wheel having a plurality of channel-symbols on the periphery thereof; means for operatively intercoupling said tuner and said channel-symbol wheel whereby as said tuner is scanned said channel-symbol wheel is caused to assume a printing position in accordance with the channel setting of the receiver; and means responsive to said output signal to activate said channel-symbol printer and said time printing means simultaneously to print said indicia of time and channel setting and including time delay means for preventing the activation of said time printing means and said channel-symbol printer for a predetermined period of time after said tuner's scanning has been arrested, said printing device including means for recording the time at which said local television receiver is turned on and means for recording the time at which said television receiver is turned off on said recording medium.

9. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel symbol printer, and a control mechanism to activate said time printing means and said symbol printer to provide channel, setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency means for causing said scanning means to scan past the lowest frequency receivable by said tuner before said arresting means is operative; and actuating means coordinating said printing device with said scanning system; a channel-symbol wheel having a plurality of channel-symbols on the periphery thereof; means for operatively intercoupling said tuner and said channel-symbol wheel whereby as said tuner is scanned said channel-symbol wheel is caused to assume a printing position in accordance with the channel setting of the receiver; and means responsive to said output signal to activate said channel-symbol printer and said time printing means simultaneously to print said indicia of time and channel setting and including time delay means for preventing the activation of said time printing means and said channel-symbol printer for a predetermined period of time after said tuner's scanning has been arrested, said printing device including means for recording the time at which said local television receiver is turned on, means for recording the time at which said television receiver is turned off, and means for recording the time at which a power failure occurs on said recording medium.

10. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; an actuating means coordinating said printing device with said scanning system including means operatively intercoupling said tuner and said channel-symbol printer whereby as said tuner is scanned said channel-symbol is caused to assume a printing position in accordance with the channel setting of the receiver; said channel-symbol printer including a plurality of relays each having a channel-symbol associated therewith and a step-switch mechanically coupled to said scanning means arranged to activate the relay corresponding to the position of said tuner as said tuner is scanned; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for preventing the activation of said time printing means and said channel-symbol printer for a predetermined period of time after said tuner's scanning has been arrested.

11. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; an actuating means coordinating said printing device with said scanning system including means operatively intercoupling said tuner and said channel-symbol printer whereby as said tuner is scanned said channel-symbol is caused to assume a printing position in accordance with the channel setting of the receiver; said channel-symbol printer including a plurality of relays each having a channel-symbol associated therewith and a step-switch mechanically coupled to said scanning means arranged to activate the relay corresponding to the position of said tuner as said tuner is scanned; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for preventing the activation of said time printing means and said channel-symbol printer for a predetermined period of time after said tuner's scanning has been arrested, and coupling means comprising a tube shield for said local oscillator tube having a single loop of induction wire positioned on the interior walls thereof, connecting wires attached to the ends of said loop and means operatively intercoupling said connecting wires with said tuner; scanning means automatically causing said tuner to scan throughout its channel range and means responsive to the frequency of the incoming local oscillator frequency to arrest said scanning means at the tuner channel corresponding thereto to produce output signal; an actuating means coordinating said printing device with said scanning system including means operatively intercoupling said tuner and said channel-symbol printer whereby as said tuner is scanned said channel-symbol is caused to assume a printing position in accordance with the channel setting of the receiver; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for preventing the activation of said time printing means and said channel-symbol printer for a predetermined period of time after said tuner's scanning has been arrested.

12. Apparatus for recording the listening habits of a user of a multi-channel television receiver having a local oscillator whose frequency varies step-wise as the receiver is selectively tuned, said apparatus comprising a printing device to record the channel setting of said receiver and the dwell time thereat; said device including a time printing means, a channel-symbol printer, and a control mechanism to activate said time printing means and said symbol printer to provide channel setting and time indicia on a recording medium; a scanning system coupled to the local oscillator of said receiver and including a multi-channel tuner tunable step-wise to the respective frequencies of said local oscillator to produce an output signal only when the tuner is tuned to the selected frequency of the local oscillator; scanning means automatically causing said tuner to scan throughout its channel range and means responsive to said output signal to arrest said scanning means at the tuner channel corresponding to the selected local oscillator frequency; means for causing said scanning means to scan past the lowest frequency receivable by said tuner before said arresting means is operative; an actuating means coordinating said printing device with said scanning system including means operatively intercoupling said tuner and said channel-symbol printer whereby as said tuner is scanned said channel-symbol is caused to assume a printing position in accordance with the channel setting of the receiver; said channel-symbol printer including a plurality of relays each having a channel-symbol associated therewith and a step-switch mechanically coupled to said scanning means arranged to activate the relay corresponding to the position of said tuner as said tuner is scanned; and means responsive to said output signal to activate said channel-symbol printer and said time printing means simultaneously to print said indicia of time and channel setting; means for causing said scanning means to scan past the lowest frequency receivable by said tuner before said arresting means is operative; and time delay means for preventing the activation of said time printing means and said channel-symbol printer for a predetermined period of time after said tuner's scanning has been arrested; said printing device including means for recording the time at which said local television receiver is turned on and means for recording the time at which said television receiver is turned off.

13. In a scanning system including a tuner, automatic scanning means for tuning said tuner throughout its range, and arresting means coupled to said tuner and responsive to an output signal from said tuner to arrest said automatic scanning means; actuating means for preventing said arresting means from arresting said automatic scanning means until said tuner has scanned past the lowest frequency receivable by said tuner comprising shorted contact means positioned within said tuner at the position corresponding to the position of the lowest frequency receivable by said tuner, a first and a second relay means within said arresting means, means for intercoupling said shorted contact means to said first relay means, whereby said first relay means remains open until said tuner scans to said shorted position whereupon said first relay means closes, means for intercoupling said first relay means and said second relay means whereby said second relay may be closed by said output signal only after said first relay has closed, and means for intercoupling said second relay with said arresting means whereby said arresting means is actuated on the closing of said second relay means by said output signal.

14. In a scanning system including a multi-channel tuner, automatic scanning means for tuning said tuner step-wise throughout its channel range, and arresting means coupled to said tuner and responsive to an output signal from said tuner to arrest said automatic scanning means; actuating means for preventing said arresting means from arresting said automatic scanning means until said tuner has scanned past the lowest frequency receivable by said tuner comprising shorted contact means positioned within said tuner at the position corresponding to the position of the lowest frequency receivable by said tuner, a first and a second relay means within said arresting means, means for intercoupling said shorted contact means to said first relay means, whereby said first relay means remains open until said tuner scans to said shorted position whereupon said first relay means closes, means for intercoupling said first relay means and said second relay means whereby said second relay may be closed by said output signal only after said first relay has closed, and means for intercoupling said second relay with said arresting means whereby said arresting means is actuated on the closing of said second relay means by said output signal.

References Cited in the file of this patent

UNITED STATES PATENTS

| | | |
|---|---|---|
| 1,827,208 | Riebe | Oct. 13, 1931 |
| 2,153,185 | Harrison | Apr. 4, 1939 |
| 2,195,868 | Naylor et al. | Apr. 2, 1940 |
| 2,421,933 | Goldstine | June 10, 1947 |
| 2,483,573 | Clark | Oct. 4, 1949 |
| 2,513,360 | Rahmel | July 4, 1950 |
| 2,660,507 | Cordell | Nov. 24, 1953 |
| 2,660,665 | Scherbatosky | Nov. 24, 1953 |
| 2,674,512 | Bogert et al. | Apr. 6, 1954 |

UNITED STATES PATENT OFFICE
CERTIFICATION OF CORRECTION

Patent No. 2,965,433 December 20, 1960

Norman Alpert et al.

It is hereby certified that error appears in the above numbered patent requiring correction and that the said Letters Patent should read as corrected below.

Column 1, line 53, for "scannnig" read -- scanning --; column 7, line 45, for "taken" read -- take --; column 9, line 16, for "turnable" read -- tunable --; line 18, for "channel tuner tunable step-wise to the respective" read -- signal only when the tuner is tuned to the selected --; column 11, line 12, for "befor" read -- before --.

Signed and sealed this 22nd day of August 1961.

(SEAL)
Attest:

ERNEST W. SWIDER
Attesting Officer

DAVID L. LADD
Commissioner of Patents